Nov. 20, 1934.  J. GANS  1,981,645
DRY CLEANING APPARATUS AND METHOD OF UTILIZING
FILTER AID IN CONNECTION THEREWITH
Filed Aug. 27, 1932
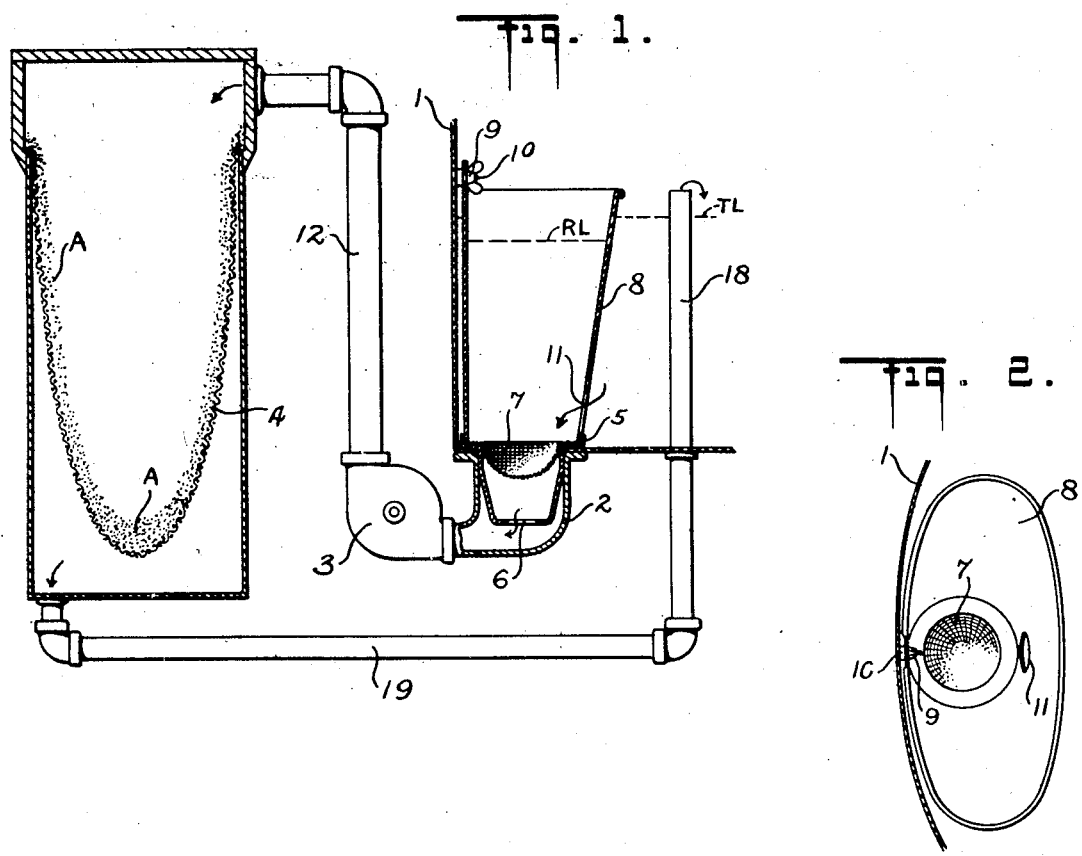
INVENTOR
John Gans
BY
his ATTORNEYS Patented Nov. 20, 1934

1,981,645

UNITED STATES PATENT OFFICE 1,981,645

DRY CLEANING APPARATUS AND METHOD OF UTILIZING FILTER AID IN CONNECTION THEREWITH

John Gans, Grymes Hill, Staten Island, N. Y., assignor to Columbia Appliance Corporation, New York, N. Y., a corporation of New York Application August 27, 1932, Serial No. 630,610

7 Claims. (Cl. 210—62)

The present invention relates to dry cleaning apparatus and method of utilizing filter aid in connection therewith. In well known forms of apparatus for this purpose, cleaning is effected in a washing machine comprising a tank and a basket or holder for the articles to be cleaned which is rotated or otherwise moved through a supply of liquid solvent, such as trichlorethylene. According to one mode of operation, the solvent is continuously removed from the washer or tank, filtered and then returned to the washer in equal volume. According to another method, the solvent is used until it becomes so dirty that it is no longer capable of effective cleaning, whereupon it is drawn off from the washer in a batch after which it is filtered and returned to the washing machine.

In many cases filtering is made more effective by employing what is known in the art as filter aid. This is introduced in finely divided condition into the solvent to be filtered and moves along with the stream of solvent until intercepted by the filtering medium, frequently in the form of suitable fabric mounted between the inlet and outlet ends of a casing. A pump located either at the inlet side of the filter or at its outlet side is commonly employed to move the dirty liquid from the tank to the filter and to return the cleaned liquid from the filter to the tank or washer.

Where the solvent is continuously removed for filtering and returned in equal amount during cleaning, it has been found that if filter aid is introduced into or remains in the washer during the washing operation, it contacts with the articles therein and, when these articles are dried, appears thereon as a thin deposit of dust or dust-like substance. This defeats in part the purpose of the cleaning and under many conditions produces work which is unacceptable to the customer.

One object of my invention has been to provide apparatus for use in dry cleaning and a method of utilizing filter aid in connection therewith, whereby filter aid can be effectively brought into the filter either as a step in the cleaning methods hereinabove referred to or independently thereof and without harmful or undesirable contamination of the solvent in the washer. My improved method includes the steps of introducing the filter aid into a supply of clean solvent and then moving said solvent into and through the filter where it deposits the filter aid in operative relation to the filtering medium and, thereupon, is conducted or returned to the tank or washer for use in cleaning. When so applied, the filter aid serves to condition the filtering element or medium in advance of its normal filtering use by forming a pervious coating thereon which reduces the interstices of the medium and otherwise improved the effectiveness of the filter.

A preferred embodiment of apparatus employing my invention is described in the following specification and illustrated in the drawing appended thereto and in which—

Figure 1 is a view in section of a portion of a washing or dry cleaning machine equipped with one form of apparatus for introducing filter aid and which is located within the tank of the washer; and Figure 2, a fragmentary plan view thereof.

As indicated in the drawing, my invention is applied to a dry cleaning machine of the type in which a basket, not shown, is rotatably mounted in a washer or tank 1 which, in operation, holds a supply of liquid solvent suitable for the purpose. It will be understood that this machine is adapted to be used if desired in connection with the continuous cleaning process previously explained, and during which the used solvent is continuously discharged from the washer, as by a pump 3, into and through a filter 4 and returned in cleaned condition to the washer.

The embodiment of my invention illustrated in Figures 1 and 2 is particularly adaptable to certain types of washing machines now in use and heretofore not equipped with special apparatus for properly introducing and utilizing filter aid. In such devices, the tank or washer 1 is provided with an outlet opening in its bottom wall and an outlet fitting 2, forming part of a discharge conduit 12 in which is interposed a pump 3 to withdraw liquid from the washer and force it into and through filter 4 and thence back to the washer. To equip this apparatus with my improved device, I provide an adapter in the form of a tapered spinning arranged and adapted to fit snugly into the opening of the fitting 2. Its upper portion provides an upright peripheral flange 5 and its lower or tapered portion has an outlet opening 6. A strainer 7 having an annular peripheral bearing portion is fitted within the flange 5 and rests upon a shoulder formed adjacent thereto. The filter aid receptacle 8, shown in the drawing as open at the top and bottom, is secured to the washer tank by means of a wing nut 9 cooperating with a stud 10 affixed to the wall of the washer; and the bottom end of said receptacle is secured to or made continuous with the flange 5 by soldering or otherwise. The receptacle is also provided with a solvent admitting opening 11 which affords free communication with the interior of the washer 1. The described arrangement forms, in effect, a tank or receptacle having a washing compartment and a separate filter aid applying compartment communicating with the washing department through opening 11.

The cleaning liquid in the washer is maintained by pump 3 at a predetermined suitable level, indicated by the line TL, Figure 1, this level being below the upper edge of the receptacle or filter aid compartment 8 so that there will be no overflow of the contents thereof into the contents of said washing compartment of the washer. In operation liquid flows from the supply in the washer through the opening 11 into receptacle 8 and establishes itself therein at a predetermined level, for example as indicated by the lines RL, Figure 1, this level varying under different conditions, but being preferably above the upper edge of inlet opening 11. With the parts arranged as described and with the pump operating to produce the continuous outflow of liquid hereinabove referred to, the filter aid is conveniently introduced as needed through the top opening of receptacle 8 and mixes with the liquid contents of said receptacle from which it is drawn along with said liquid contents past the strainer 7 and out through the opening 6 to conduit 12 and into filter 4. It will be apparent, that, although filter aid mixes with the liquid contents of the receptacle or compartment 8 and the interior of said receptacle is in free communication with the interior of the washing compartment of the washer, the direction of flow of discharged solvent is always from the supply in the washer out through the opening 11 in receptacle 8, so that there is no counter-flow and therefore no mixing or mingling of the filter aid with the solvent to be used or actually in use in the washer during the cleaning operation.

Figure 1 shows, in addition to the washer 1, conduit 12 and pump 3, one arrangement of suitable means for returning the filtered solvent to the interior of the washer and which include an inlet pipe 18 communicating through the bottom of washer 1 with a conduit 19 leading from the filter.

From the foregoing description of apparatus embodying my invention and of the modes of operation hereinabove set forth in respect thereto, it will be apparent that I have provided means and a method whereby the filter aid may be effectively introduced into the stream of solvent discharged from a washer or the like and deposited in a layer, as A, on the filtering medium either prior to use of the solvent for washing in which case the solvent is clean or during normal washing operations, if desired, without mingling or mixing it with the effective cleaning contents of said washer; and that, as thus used, the filter aid effectively accomplishes its purpose of conditioning the filter without injurious or undesirable results in relation to the objects or materials cleaned in the washer.

In operations involving the use of apparatus embodying my invention, the filter aid is preferably introduced before cleaning or washing begins, in which case it is mixed with fresh or cleaned solvent, i. e. substantially free from dirt particles or other material usually filtered out to reclaim the solvent. For example, in an initial operation with fresh filter bags or media, a suitable supply of fresh or cleaned solvent is supplied to the washer and, before being used for washing, is pumped to and through the filter until a return stream through pipe 18 is established. Then a suitable amount of filter aid, about one ounce for each square foot of effective filtering area of the filter medium is introduced into the clean solvent as previously described, care being taken that no filter aid remains in any portion of the solvent while it is used in washing. One advantage of this method over the practice in which the filter aid is added to the dirty solvent is that the filter is brought into proper condition to operate effectively before dirty liquid is fed thereto; whereas, according to said other method, the filter functions less perfectly in the beginning due to the absence of an effective initial deposit or layer of filter aid in the filter and in or about by passes or leaks therein. After a period of filtering with a given inital layer or deposit of filter aid, as A, Figure 1, the filter may be reconditioned by the application of another layer over the first. For this purpose, I have found that such reconditioning is effective where the amount of filter aid introduced is approximately 5% of the amount first employed, and may be repeated as often as necessary between washing operations by using the last filtered liquid or a portion thereof to carry the additional filter aid into the filter.

Other advantages and beneficial results in operation will be apparent from further consideration of the structures and method above described.

I claim:—

1. In dry cleaning apparatus employing liquid solvent as a dirt removing medium, the combination of a washer having a discharge opening, a filter connected thereto, and an auxiliary receptacle within and operatively connected to the washer and having an inlet opening arranged to receive liquid from the washer, an opening located above the level of liquid in the washer through which to admit filter aid into the receptacle, and an outlet port to discharge liquid and filter aid from said receptacle through the discharge opening of the washer and into said filter.

2. In dry cleaning apparatus, the combination of a washer having an outlet opening in its bottom wall, a filter connected to said outlet opening and an auxiliary receptacle open at its top end and at its bottom end and having its bottom end removably seated in relation to said outlet opening, said receptacle having an opening near its bottom end adapted to pass liquid from the washer into the receptacle.

3. In dry cleaning apparatus, the combination of a washer having an outlet opening in its bottom wall, a filter connected to said outlet opening, an auxiliary receptacle open at its top and bottom and having its bottom end removably seated in said outlet opening, said receptacle having an opening near its bottom end adapted to pass liquid from the washer into the receptacle, and a means for releasably securing said receptacle in operative position with respect to said outlet opening in the bottom wall of the washer.

4. The combination of a washer adapted to hold a supply of liquid, an outlet conduit in a wall of said washer, a filter connected to said conduit and a receptacle having a tapered end portion adapted to be removably seated in said conduit, said receptacle having an upper opening above the level of the liquid supply in the washer to admit filter aid, a lower opening below said level to admit liquid from the washer into said receptacle and a bottom opening to discharge said liquid and said filter aid.

5. The combination of a washer adapted to hold a supply of liquid, an outlet conduit in a wall of said washer, a filter connected to said conduit and a receptacle having a tapered end portion adapted to be removably seated in said conduit, said receptacle having an upper opening above the level of the liquid supply in the washer to admit filter aid, a lower opening below said level to admit liquid from the washer into said receptacle and a bottom opening, and a strainer between said bottom opening and said outlet conduit.

6. Method of filtering a cleaning liquid in connection with its use in dry cleaning which includes segregating a portion of the supply of cleaning liquid from other portions thereof in the washer, entraining filter aid with said segregated portion, withdrawing said portion and said filter aid from the washer along with other portions of the cleaning liquid, filtering the withdrawn liquid, and returning the filtered withdrawn liquid to the washer.

7. In dry cleaning apparatus, the combination of a washer including a washing compartment, an auxiliary compartment provided with an opening through which to admit filter aid, a direct hydrostatic connection between said washing and auxiliary compartments whereby the liquid level of the washing compartment under static conditions would find itself in said auxiliary compartment, a discharge port for said washing compartment, said port being connected with said auxiliary compartment to cause circulation of some of the liquid discharging from said washing compartment in said auxiliary compartment, a filter connected with said discharge port for filtering liquid from said washing compartment, and means for returning filtered liquid from the filter to the washing compartment.

JOHN GANS.